United States Patent
Kring et al.

(10) Patent No.: US 8,641,136 B2
(45) Date of Patent: Feb. 4, 2014

(54) VEHICLE PANEL

(75) Inventors: Christopher Scott Kring, Grand Haven, MI (US); Todd D. Nellis, Zeeland, MI (US); Dennis J. Vanhouten, Wyoming, MI (US); Bobby Bagby, Zeeland, MI (US); Julie M. DeVries, Zeeland, MI (US); Ben Edward Sapak, West Olive, MI (US); Kevin A. Tomasek, Zeeland, MI (US); Peter Oosting, Grand Rapids, MI (US); Brent Donald Rockafellow, Holland, MI (US); Albert Charles Haak, Holland, MI (US); Jason M. Scholten, Hudsonville, MI (US); Rade Milanovic, Holland, MI (US); William J. Homik, West Olive, MI (US); Jack Lawrence Johnson, Holland, MI (US)

(73) Assignee: Johnson Controls Technology Compay, Holland, MI (US)

( * ) Notice: Subject to any disclaimer, the term of this patent is extended or adjusted under 35 U.S.C. 154(b) by 0 days.

(21) Appl. No.: 12/672,886

(22) PCT Filed: Aug. 8, 2008

(86) PCT No.: PCT/US2008/009561
§ 371 (c)(1), (2), (4) Date: Feb. 15, 2011

(87) PCT Pub. No.: WO2009/023147
PCT Pub. Date: Feb. 19, 2009

(65) Prior Publication Data
US 2011/0133522 A1 Jun. 9, 2011

Related U.S. Application Data

(60) Provisional application No. 60/935,413, filed on Aug. 10, 2007.

(51) Int. Cl.
*B60R 13/02* (2006.01)

(52) U.S. Cl.
USPC .................................................. 296/214

(58) Field of Classification Search
USPC ...................................................... 296/214
See application file for complete search history.

(56) References Cited

U.S. PATENT DOCUMENTS

| 5,186,517 A | 2/1993 | Gilmore et al. |
| 5,275,865 A | 1/1994 | Nicolay |

(Continued)

FOREIGN PATENT DOCUMENTS

| CN | 1733459 A | 2/2006 |
| CN | 101873950 A | 10/2010 |

(Continued)

OTHER PUBLICATIONS

International Preliminary Report of Patentability mailed Feb. 16, 2010 in PCT/US2008/009561, 8 pages.

(Continued)

*Primary Examiner* — H Gutman
(74) *Attorney, Agent, or Firm* — Foley & Lardner LLP (57) ABSTRACT

A vehicle panel with a folded-over or wrapped edge is disclosed. The vehicle panel comprises a main body portion. The main body portion includes a first layer and a second layer. The first layer is formed of a substantially rigid material and has a first surface, a second surface and an edge. The second layer is coupled to the second surface of the first layer and formed of a substantially flexible material. The vehicle panel also comprises a flap integrally formed with the main body portion at the edge and comprises at least the second layer. The vehicle panel further comprises a hinge separating the flap from the main body portion, the hinge is defined by at least a portion of the first layer having a reduced thickness. The flap is folded back about the hinge towards the first surface of the first layer to substantially conceal the edge.

7 Claims, 6 Drawing Sheets

(56) References Cited

U.S. PATENT DOCUMENTS

| | | | |
|---|---|---|---|
| 5,565,053 | A | 10/1996 | Happich |
| 6,161,895 | A | 12/2000 | Jaeckle et al. |
| 2005/0231006 | A1 | 10/2005 | Pfeffer et al. |

FOREIGN PATENT DOCUMENTS

| | | |
|---|---|---|
| EP | 0 492 466 A1 | 7/1992 |
| EP | 1 627 720 A1 | 2/2006 |
| FR | 2 815 569 | 4/2002 |

OTHER PUBLICATIONS

International Search Report for PCT/US2008/009561 completed Sep. 17, 2009.

Chinese Office Action dated Jun. 20, 2012 and its English Translation as received in corresponding Chinese Application No. 200880109445.6.

Chinese Office Action dated Sep. 15, 2011 and its English Translation as received in corresponding Chinese Application No. 200880109445.6.

VEHICLE PANEL

CROSS-REFERENCE TO RELATED PATENT APPLICATIONS

This application is a National Phase Application of PCT/US2008/009561, filed Aug. 8, 2008, which claims the benefit and priority of U.S. Provisional Patent Application No. 60/935,413, filed Aug. 10, 2007. The foregoing applications are incorporated by reference herein in their entirety.

BACKGROUND

The present disclosure relates generally to a panel for a vehicle. More specifically, the present disclosure relates to a panel, such as a headliner, having a wrapped or folded-over edge and a method of manufacturing a panel with a wrapped or folded-over edge.

Headliners are vehicle panels that are coupled to a support structure or roof of a vehicle. Headliners may include one or more peripheral edges that are visible to an occupant within the vehicle. Headliners may also include one or more edges that define an opening in the headliner, such as an opening for a sunroof. In certain applications it may be desirable to provide one or more of these edges with a finished appearance so as to improve the aesthetics within the vehicle for the vehicle occupant. It may also be desirable to provide one or more of these edges with a structural or reinforcement member. For example, as sunroofs increase in size (e.g., panoramic sunroofs, etc.), there is less and less headliner material surrounding them, which may lead to weaker headliners that have a tendency to fold or crack alongside the sunroof opening. Secondary reinforcements may be added to the headliner to strengthen the headliner around the sunroof opening. Such reinforcements are generally manufactured separately with an injection molding or vacuum-forming process and can be costly. There continues to be a need to improve the configuration of vehicle panels, including vehicle headliners, particularly the edges of vehicle panels.

SUMMARY

One embodiment relates to a vehicle panel. The vehicle panel comprises a main body portion. The main body portion includes a first layer and a second layer. The first layer is formed of a substantially rigid material and has a first surface, a second surface and an edge. The second layer is coupled to the second surface of the first layer and formed of a substantially flexible material. The vehicle panel also comprises a flap integrally formed with the main body portion at the edge and comprises at least the second layer. The vehicle panel further comprises a hinge separating the flap from the main body portion, the hinge is defined by at least a portion of the first layer having a reduced thickness. The flap is folded back about the hinge towards the first surface of the first layer to substantially conceal the edge.

Another embodiment relates to a method of manufacturing a vehicle panel. The method comprises forming a main body portion having a substantially rigid substrate and a substantially flexible cover material coupled to the substrate. The substrate has an edge. The method also comprises providing an area of reduced thickness in the substrate. The area of reduced thickness defines a living hinge. The method further comprises integrally forming a flap with the main body portion. The flap is provided on a side of the living hinge opposite the main body portion and comprises at least the cover material. The method further comprises folding the flap about the living hinge towards the substrate of the main body portion to substantially conceal the edge.

DETAILED DESCRIPTION

Figure 1:
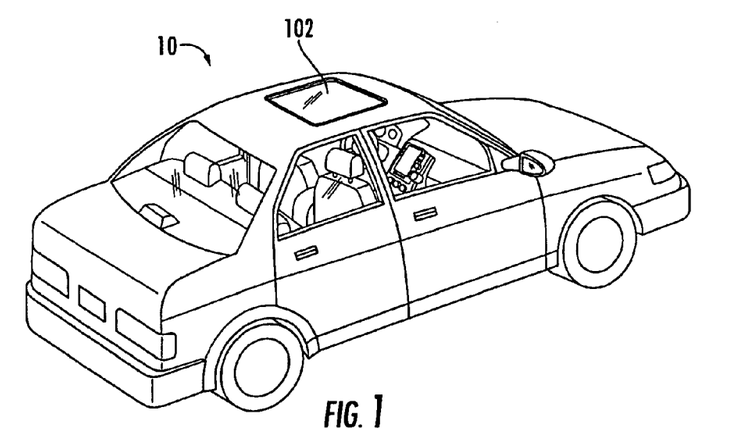
FIG. 1 is an isometric view of a vehicle according to an exemplary embodiment.
Figure 2:
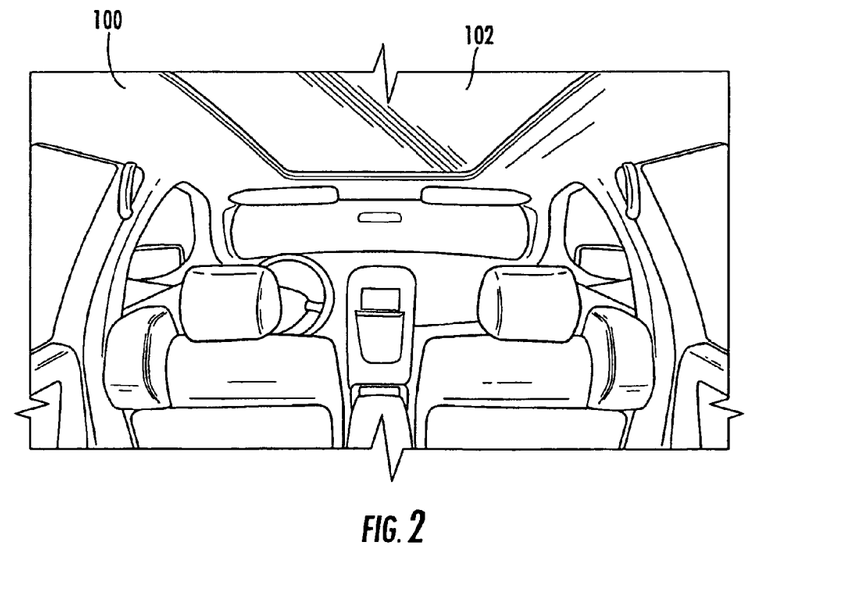
FIG. 2 is an isometric view of the interior of the vehicle of FIG. 1 showing a headliner according to an exemplary embodiment.

Referring generally to FIGURES, exemplary embodiments of a panel for use in a vehicle (e.g., automobiles such as cars, trucks, sport utility vehicles, minivans, buses, and the like; airplanes, boats, etc.) are shown. The vehicle panel includes one or more edges (e.g., peripheral edges, internal edges, etc.) that include a folded-over or wrapped edge. The folded-over or wrapped edges may be provided for aesthetic purposes and/or functional purposes. For example, the folded-over or wrapped edges may function as a reinforcement member that improves the strength and/or rigidity of the vehicle panel. The folded-over or wrapped edge may also prevent creases from propagating from the edge and further help to reduce the chance of fabric fraying along an edge. Such vehicle panels may be installed at any suitable location within a vehicle (e.g., side walls, floors, headliners, etc.) and integrated with any other vehicle component. The vehicle panels may be provided in a wide variety of sizes, shapes, and configurations, and made from a wide variety of materials and manufacturing processes according to various exemplary embodiments. All such variations are intended to be within the scope of the inventions:

Referring to FIGS. 1 and 2, the vehicle panel is shown according to an exemplary embodiment as a headliner 100 that is configured to be supported at or coupled to the roof of a vehicle 10. According to the embodiment illustrated, the headliner 100 includes an opening 102 for a sunroof (e.g., a panoramic sunroof, vista roof, etc.). The portions of the headliner 100 surrounding the opening 102 may be relatively narrow and/or may have a tendency to crack or bend, especially if the opening 102 is for a larger sunroof (e.g., a panoramic sunroof). According to the various alternative embodiments, the headliner 100 may include additional openings (e.g., for a second sunroof, for an attachment opening, etc.) or may be a substantially continuous panel without any openings.

Figure 3:
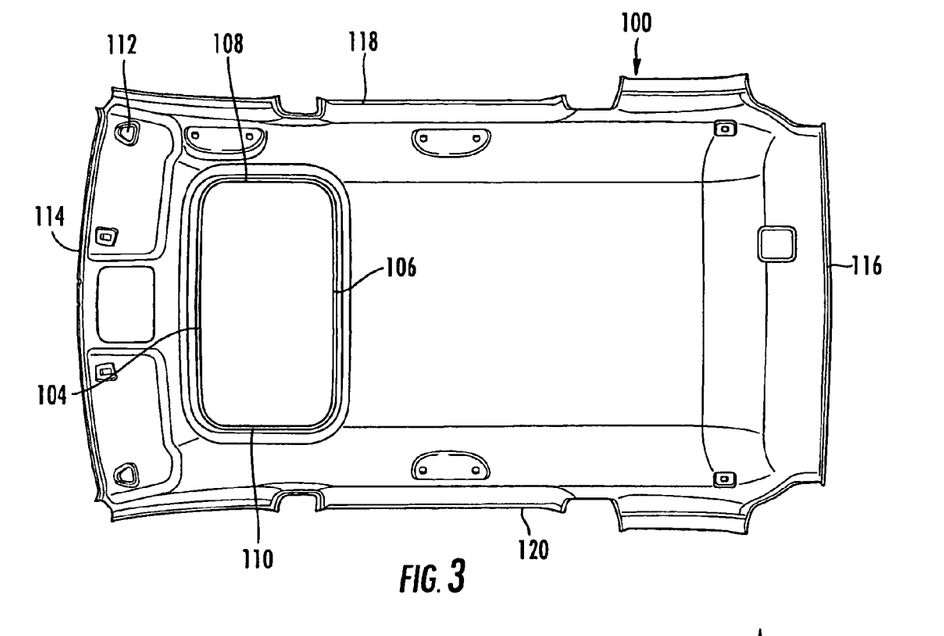
FIG. 3 is a bottom plan view of a headliner according to an exemplary embodiment and including an opening for a sunroof.

FIG. 3 shows a plan view of the headliner 100 according to an exemplary embodiment. The headliner 100 includes one or more edges that define the periphery of the headliner 100. For example, the headliner 100 is shown as including a first or front peripheral edge 114, a second or rear peripheral edge 116, a third or driver-side peripheral edge 118 and a fourth or passenger-side peripheral edge 120. The opening 102 for the sunroof is defined by a first boundary, shown as a front edge 104, a second boundary, shown as a rear edge 106, a third boundary, shown as a driver-side edge 108, and a fourth boundary, shown as a passenger-side edge 110. The front edge 104, the rear edge 106, the driver-side edge 108 and the passenger-side edge 110 cooperate to define a substantially rectangular opening for the sunroof. The headliner 100 is also shown as including an number of additional openings for receiving various components (e.g., fasteners, grab handles, pillars, overhead consoles, etc.) upon installation of the headliner 100. For example, the headliner 100 includes an opening 112 configured to receive a support member for a visor assembly.

Figure 4:
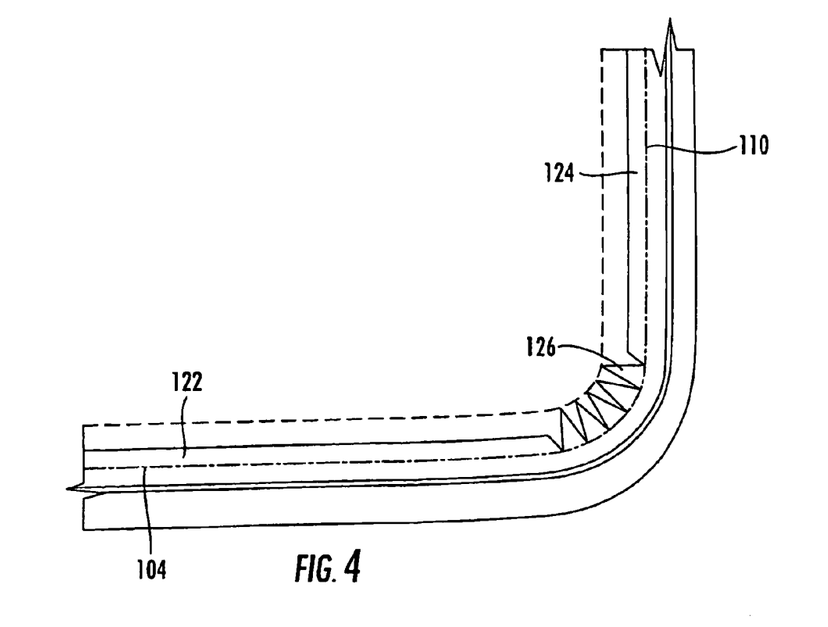
FIG. 4 is a partial bottom plan view of the headliner of FIG. 3 showing an edge of the headliner around the opening before it has been finished.

Referring to FIG. 4, the opening 102 for the sunroof may be formed during a molding process or may be formed in a secondary operation by removing a portion of the headliner material (e.g., scrap, offal, etc.). If the opening 102 is formed by removing a portion of the headliner material, the material removed may be used elsewhere in the vehicle. For example, the headliner material may be used to construct seat backs, side panels for a floor console, or door panel speaker enclosures. Further, a substrate of the headliner material (i.e., fiberglass-reinforced polypropylene, etc.) may make scrap material useful for other purposes such as forming totes, outdoor storage cabinets or drink trays. For such uses, the substrate may be wrapped with other materials (e.g., vinyl, fabric, etc.) or may not be wrapped with any covering. Such reuse of the scrap from the headliner may help to reduce the amount of material that is discarded.

According to an exemplary embodiment, one or more flaps (e.g., extensions, strips, etc.), shown as a front flap 122, a passenger side flap 124 and a corner flap 126, are provided after the opening 102 has been formed. The flaps are coupled to the main body of the headliner along the edges of the opening 102 and may be folded back onto the headliner 100 to provide a folded-over or wrapped edge for aesthetic purposes and/or to form a reinforcement member or an integrated stiffener. According to an exemplary embodiment, the flaps are integrally formed with a main body 128 of the headliner 100 and formed of substantially the same material(s) as the main body 128. According to the various alternative embodiments, the flaps may be separate members that get attached to the main body 128. For example, the flaps may be trimmed from the main body 128 or any other panel and attached to the main body 128 near an edge with a suitable process (e.g., reheating the material, adhesives, sewing, ultra-sonic welding, etc.).

In addition to providing reinforcement for the headliner 100, the flaps may provide further functional benefits. For example, the flaps may be configured to provide a head impact counter measure, an attachment area for other body panels, an attachment area for coupling the panel to the vehicle framework or structure, or an attachment area for various vehicle components (e.g., overhead system components, etc.).

According to an exemplary embodiment, the flaps are provided on each side of the headliner 100 that defines the opening 102 (e.g., around the entire periphery of the opening 102, etc.). According to the embodiment illustrated, the flaps provided along the lengths of the opening 102 (i.e., the front flap 122 and the passenger side flap 124, etc.) are generally rectangular in shape and have a depth sufficient to substantially wrap or conceal the adjacent edge. For example, the flaps 122, 124 may have a depth between approximately 15 and approximately 20 millimeters wide after being trimmed, but according to the various alternative embodiments, may be any suitable size depending on the particular application. The corner flap 126 is shown as including a plurality of sections or darts which will allow the combination of flaps to provide the appearance of a substantially continuous edge when folded back onto the headliner 100 and secured thereto.

Configuring the flaps 122, 124 and/or 126, referred to hereunder as just the flap 122 for simplicity, as a reinforcement member may minimize or eliminate cracking of the headliner 100 between the sides of the opening 102 and the peripheral edges of the headliner 100. Configuring the flap 122 for aesthetic purposes may provide the appearance of a substantially continuous and cleanly wrapped (e.g., fabric wrapped, etc.) or finished edge. According to various alternative embodiments, the flap may not be configured to extend continuously around the opening 102. For example, the flap may only be provide on one or more side or lateral edges of the opening 102 (e.g., a driver-side flap and a passenger side flap, etc.).

The flap 122 may be provided in other locations besides around the opening 102 for the sunroof. For example, the headliner 100 may include the flap 122 on any exposed edges such as the front peripheral edge 114, the rear peripheral edge 116, the driver-side peripheral edge 118, the passenger-side peripheral edge 120, and/or around pillar trim areas. According to such embodiments, the flap 122 may be folded back upon the headliner 100 and secured thereto to form fabric-wrapped edges at the front peripheral edge 114, the rear peripheral edge 116, the driver-side peripheral edge 118, the passenger-side peripheral edge 120, and/or around pillar trim areas. A similar folded-edge may be used along the periphery and/or internally with other vehicle components or panels (e.g., trim panels, such as those for a pillar or a door panel, etc.).

To achieve the folded-over or wrapped edge, the headliner 100 may be formed using a variety of processes including, but not limited to, a thermofold process, an action in the molding tool to complete the folding, scoring or machining the headliner 100, overcompressing either face surface of the headliner 100, using a heated tool, using a heated rollform tool, die trimming the headliner 100, or shaping the flap to match the contours of the back surface of the headliner 100 and folding the flap over onto the back of the headliner 100.

Figure 5A:
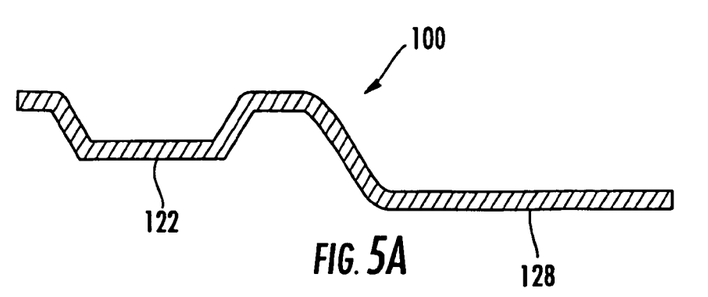
FIGS. 5A and 5B are cross-sections of a portion of a headliner showing a flap according to an exemplary embodiment being folded back onto the headliner.
Figure 5B:
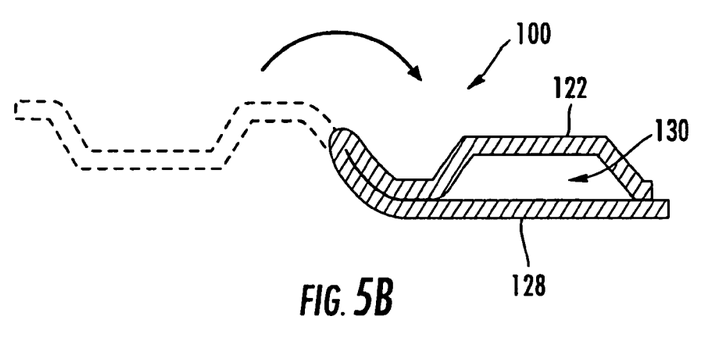

Referring to FIGS. 5A and 5B, an exemplary embodiment of a cross-section of a portion of the headliner 102 is shown before and after the flap 122 has been folded against a main body 128 of the headliner 100, respectively. As shown in FIG. 5A, the flap 122 may include a contour that forms a structural shape that may be more effective in reinforcing the headliner 100. According to the embodiment illustrated, when the flap 122 is folded back onto the main body 128, a space or channel 130 is provided between the flap 122 and the main body 128 of the headliner 100. For example, the channel 130 is shown as a generally C-shaped channel. The channel 130 may also provide a conduit for one or more vehicle systems or components (e.g., wiring harnesses, HVAC systems, etc.). It should be noted that while the flap 122 is shown as providing a reinforcement member for the headliner 100 to which the flap 122 is integrally formed therewith, according to other exemplary embodiments, the flap 122 may be removed and used as a reinforcing member for another headliner.

Referring to FIGS. 6A through 17B, further exemplary embodiments of cross-sections of a portion of the headliner 102 are shown before and after the flap 122 has been folded against the main body 128 of the headliner 100, respectively. According to the embodiments illustrated, the headliner 100 is generally formed of a first layer or portion, shown as a substrate 132, and a second layer or portion, shown as a cover material 134 (e.g., coverstock, etc.). According to an exemplary embodiment, the substrate 132 is formed of a substantially rigid material that provides at least some structural support for the headliner 100. For example, the substrate 132 may be formed of a polymer (e.g., polyurethane, polypropylene, etc), a composite such as a fiberglass-reinforced polymer, or any other material known in the art. According to an exemplary embodiment, the cover material 134 is formed of a substantially flexible material (e.g., a fabric material, etc.) that may be selected for its aesthetics.

The substrate 132 includes a first surface 136 and an opposite second surface 138. The first surface 136 is configured to face and/or be coupled to the vehicle structure, while the second surface is configured to face the occupant compartment of the vehicle. The cover material 134 is configured to be supported at the second surface 138 of the substrate 132. According to an exemplary embodiment, the cover material 134 is adhered to the substrate 132, but alternatively, may be coupled to substrate 132 using any other suitable technique.

According to an exemplary embodiment, the headliner 100 includes one or more features that allow the flap 122 to be folded back onto the main body 128 of the headliner 100 with a single step after formation (e.g., molding, etc.) of the headliner 100. According to the embodiments illustrated, such a feature is an area of reduced thickness in the substrate 132, shown as a recess 140. According to an exemplary embodiment, the recess 140 functions as a hinge (e.g., a living hinge, etc.) that facilitates of the movement of the flap 122. According to the various alternative embodiments, the recess 140 may also be provided for ornamental applications. For example, the recess 140 may allow the headliner 100 to include fabric-wrapped ornamental features such as styling lines, logos or other designs. The recess 140 may also be used for a functional application. For example, the recess 140 may be used for forming doors or panels that are configured to rupture to allow an airbag to inflate into the interior of the vehicle.

The recess 140 may be formed during a molding process of the substrate 132 or as a secondary operation after the substrate 132 has been formed. For example, the recess 140 may be formed during a molding process of the headliner 100 by providing a projection with a small radius or some other shape in a surface of the form tool. Forming the recess 140 as a secondary operation may be achieved by milling a portion of the substrate 132. For example, a portion of the substrate 132 could be removed using a waterjet or some other machining device. Another secondary operation technique that could be used to form the recess 140 is overcompressing the substrate 132 in such an area. According to an exemplary embodiment, the substrate 132 is thinned between approximately 20 percent to approximately 30 percent relative to the thickness of the substrate 132 to form to form the hinge.

Figures 6A, 6B:
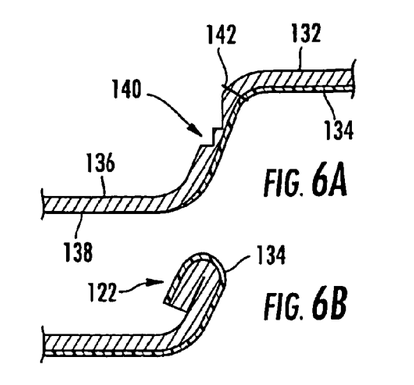
FIGS. 6A and 6B are cross-sections of a portion of a headliner showing a flap according to another exemplary embodiment being folded back onto the headliner.

Referring to FIGS. 6A and 6B in particular, the recess 140 is in the form of a double hinge. According to an exemplary embodiment, the recess 140 is formed during the molding process of the substrate 132 and includes a stepped profile in the first surface 136 of the substrate 132. Configuring the recess 140 as a double hinge may simplify folding over the flap 122 and/or reduce the likelihood of unwanted creases, bulges, and/or other imperfections after the folding is complete. According to an exemplary embodiment, the headliner 100 is configured to be trimmed or cut at a trim line 142 before the flap 122 is folded over.

Figure 7A:
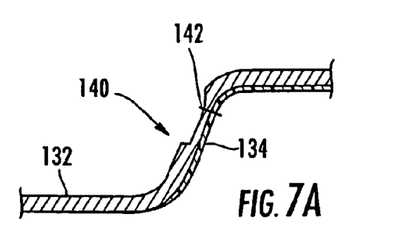
FIGS. 7A and 7B are cross-sections of a portion of a headliner showing a flap, according to another exemplary embodiment being folded back onto the headliner.
Figures 7B, 9A, 9B, 11A:
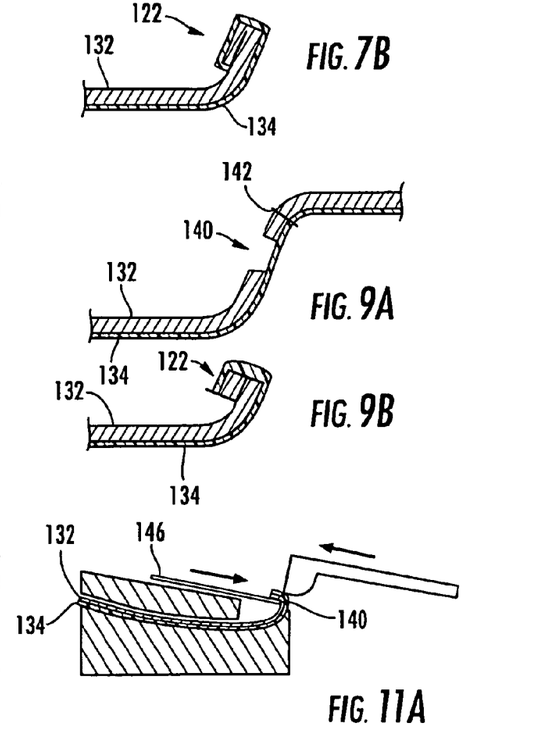
FIGS. 9A and 9B are cross-sections of a portion of a headliner showing a flap according to another exemplary embodiment being folded back onto the headliner.
FIGS. 11A and 11B are cross-sections of a portion of a headliner showing a flap according to another exemplary embodiment being folded back onto the headliner.

Referring to FIGS. 7A and 7B, the trim line 142 is within the recess 140 or at a boundary of the recess 140. In such an embodiment, when the flap 122 is folded back towards the substrate 132, the folded-over or wrap edge includes a portion of the substrate 132 (i.e., the portion associated with the flap 122, etc.) that functions as a reinforcement member for the headliner 100. The reinforcement member has a thickness that is less than the thickness of the substrate 132 of the main body 128.

Figure 8A:
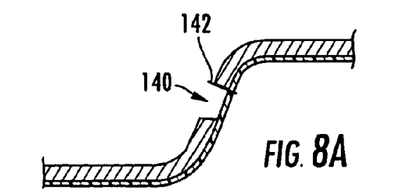
FIGS. 8A and 8B are cross-sections of a portion of a headliner showing a flap according to another exemplary embodiment being folded back onto the headliner.
Figures 8B, 10A, 10B:
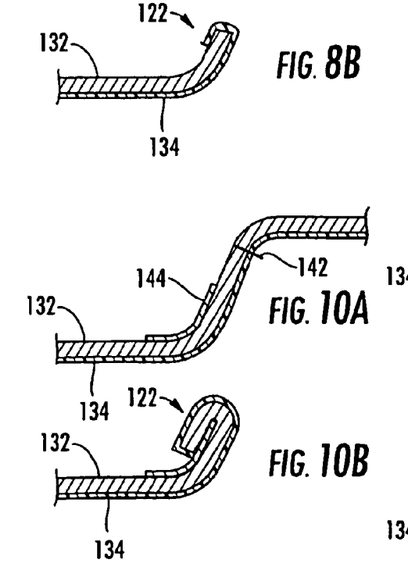
FIGS. 10A and 10B are cross-sections of a portion of a headliner showing a flap according to another exemplary embodiment being folded back onto the headliner.

Referring to FIGS. 8A and 8B, the recess 140 is formed by substantially removing all of the substrate 132 (e.g., via a secondary operation, etc.) and, similar to the embodiment illustrated in FIGS. 7A and 7B, the trim line 142 is within the recess 140 or at a boundary of the recess 140. Such an embodiment, results in a folded-over or wrapped edge that does not include a portion of the substrate 132 acting a reinforcement member. It should be noted that even without a portion of substrate 132 provided on the flap 122, the flap 122 may still provide reinforcement for the headliner 100 with just the cover material 134. For example, the cover material 134 alone may provide some reinforcement at the edge by being tensioned over the edge.

Referring to FIGS. 9A and 9B, the headliner 100 is similar to that shown in FIGS. 8A and 8B, except that the trim line 142 is located past the recess 140. In such an embodiment, when the flap 122 is folded back towards the substrate 132, the folded-over or wrap edge includes a portion of the substrate 132 (i.e., the portion associated with the flap 122, etc.) that functions as a reinforcement member for the headliner 100. The reinforcement member has a thickness that is substantially the same as the thickness of the substrate 132 of the main body 128.

Referring to FIGS. 10A and 10B, the headliner 100 includes a structural member, shown as a trim ring 144, to assist in moving the flap 122 to the folded-over or wrapped position. According to an exemplary embodiment, the trim ring 144 is added during a molding process (e.g., insert molded, etc.) behind the first surface 136 of the substrate 132.

A free end (e.g., an upper end, etc.) of the trim ring 144 defines that area about which the flap 122 is folded over.

Figure 11B:
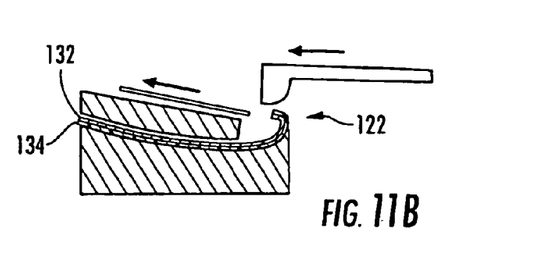

Referring to FIGS. 11A and 11B, the recess 140 is formed by overcompressing the substrate 132. Overcompressing the substrate 132 reduces the thickness of the substrate 132 thereby creating the recess 140 and providing a hinge for folding over the flap 122. The overcompressing process may be completed in a secondary operation using a tool, shown as an indenter 146, that gets retracted after the process is complete.

Figure 12A:
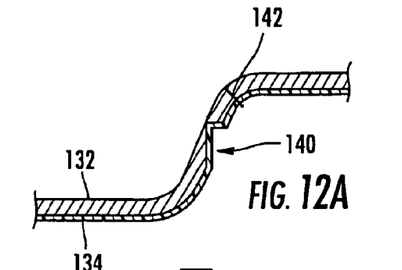
FIGS. 12A and 12B are cross-sections of a portion of a headliner showing a flap according to another exemplary embodiment being folded back onto the headliner.
Figure 12B:
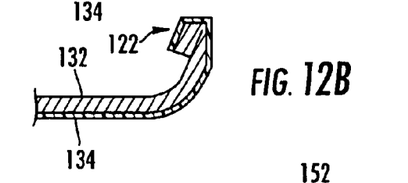

Referring to FIGS. 12A and 12B, the recess 140 is formed in the second surface 138 of the substrate 132. According to an exemplary embodiment, the recess 140 is formed during a molding process. Similar to the embodiment shown in FIGS. 12A and 12B, the trim line 142 is located past the recess 140 to provide a reinforcement member for the headliner 100 after the flap 122 is folded over.

Figure 13A:
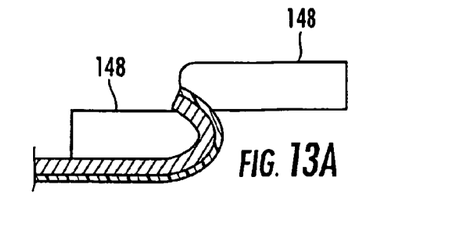
FIGS. 13A and 13B are cross-sections of a portion of a headliner showing a flap according to another exemplary embodiment being folded back onto the headliner.
Figure 13B:
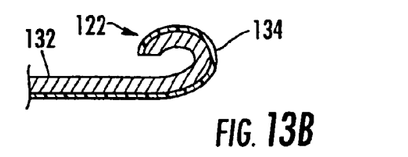
Figure 14A:
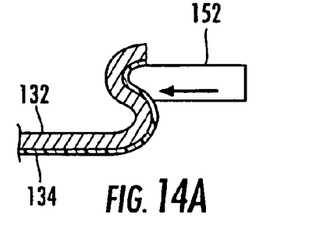
FIGS. 14A and 14B are cross-sections of a portion of a headliner showing a flap according to another exemplary embodiment being folded back onto the headliner.
Figure 14B:
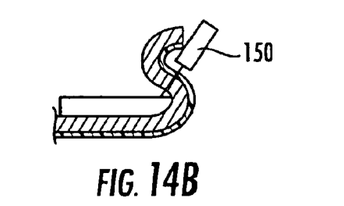
Figures 15A, 15B:
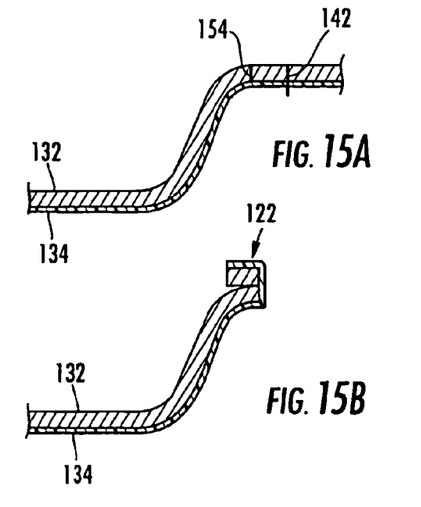
FIGS. 15A and 15B are cross-sections of a portion of a headliner showing a flap according to another exemplary embodiment being folded back onto the headliner.
Figures 16A, 16B:
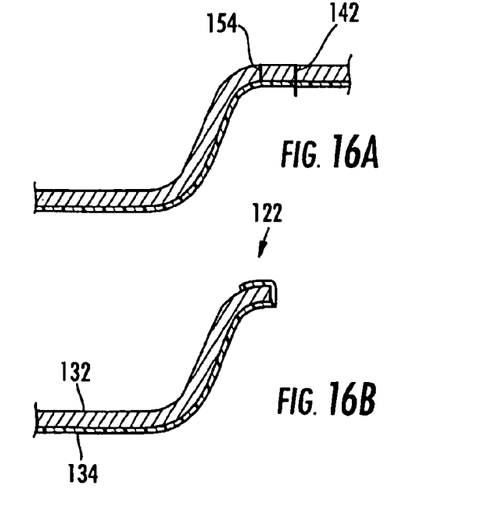
FIGS. 16A and 16B are cross-sections of a portion of a headliner showing a flap according to another exemplary embodiment being folded back onto the headliner.
Figures 17A, 17B:
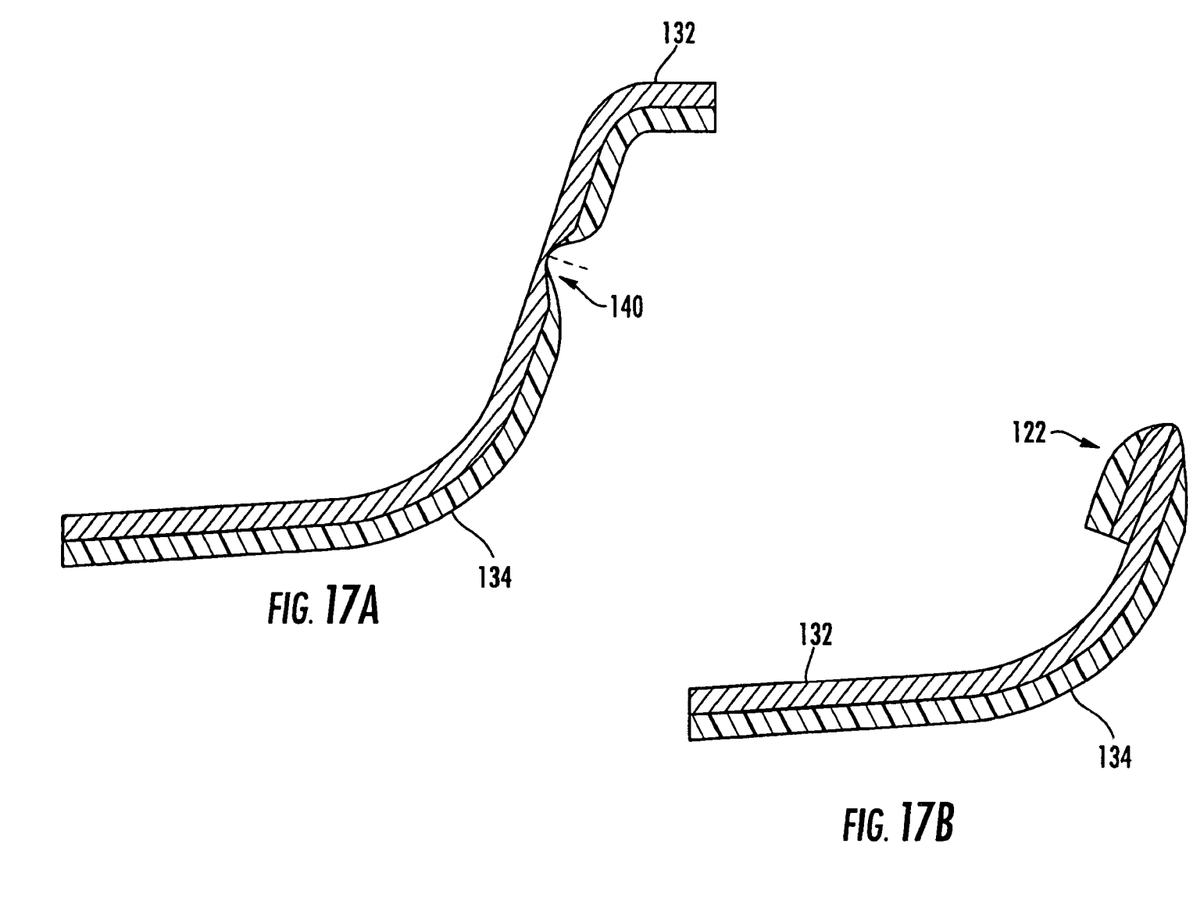
FIGS. 17A and 17B are cross-sections of a portion of a headliner showing a flap according to another exemplary embodiment being folded back onto the headliner.

Referring to FIGS. 13A and 13B, the flap 122 is shown as being folded back using a roll form die tool 148. Referring to FIGS. 14A and 14B, the recess 140 is formed in a secondary operation using a waterjet 150 and the flap 122 is folded back using a slide tool 152. Referring to FIGS. 15A and 15B and FIGS. 16A and 16B, in addition to the trim line 142, a second trim line 154 is provided. The second trim line 154 is a partial cut as it does not extend through the cover material 134. The second trim line 154 defines the point at which the flap 122 is configured to be folded about. In FIGS. 16A and 16B, the substrate 132 on the flap 122 is removed before the flap 122 is folded back towards the substrate 132 of the main body 128. Referring to FIGS. 17A and 17B, the recess 140 is formed in the second surface 138 of the substrate 132 similar to the embodiment illustrated in FIGS. 12A and 12B. In such an embodiment, an additional recess is also provided in the cover material 134 to further assist in folding the flap 122.

For purposes of this disclosure, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It is important to note that the construction and arrangement of the of the various embodiments of the vehicle panel and the methods of manufacturing the vehicle panel provided herein is illustrative only. Although only a few exemplary embodiments of the present inventions have been described in detail in this disclosure, those skilled in the art who review this disclosure will readily appreciate that many modifications are possible in these embodiments (such as variations in shape and size of the panel, the flap(s), various locations for mounting within the vehicle, etc.) without materially departing from the novel teachings and advantages of the inventions. Further, elements shown as integrally formed may be constructed of multiple parts or elements, the position of elements may be reversed or otherwise varied, and the nature or number of discrete elements or positions may be altered or varied. Further, the vehicle panel and method of manufacturing the vehicle panel may be used in any type of vehicle such as trucks, recreational vehicles, minivans, sport utility vehicles, passenger automobiles, etc. and at any suitable location within the vehicle. Accordingly, all such modifications are intended to be within the scope of the invention as defined in the appended claims.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the inventions as expressed in the appended claims.

What is claimed is:

1. A method of manufacturing a vehicle panel, the method comprising:
    forming a main body portion having a substantially rigid substrate and a substantially flexible cover material coupled to the substrate, the substrate having an edge;
    removing a portion of the substrate to form an area of reduced thickness in the substrate after forming the substrate, the area of reduced thickness defining a living double hinge;
    integrally forming a flap with the main body portion, the flap being provided on a side of the living double hinge opposite the main body portion and comprising the cover material and the substrate; and
    folding the flap after removing the area of reduced thickness and without heating the flap about the living hinge towards the substrate of the main body portion to substantially conceal the edge.

2. The method of claim 1 further comprising forming an opening in the main body portion and wherein the edge defines the opening.

3. The method of claim 1 wherein the substrate on the flap provides a reinforcement member adjacent to the edge when the flap is folded about the living hinge.

4. The method of claim 1 wherein the portion of the substrate that is removed to form the area of reduced thickness in the substrate is removed from a surface of the substrate opposite the cover material.

5. The method of claim 1 wherein the double hinge includes a stepped profile in a surface of the substrate that is opposite to the cover material.

6. The method of claim 5 wherein the stepped profile includes a first recess and a second recess, and wherein a portion of the substrate remains between the first and second recesses and the cover material.

7. The method of claim 6 wherein the first and second recesses are triangular shaped.

* * * * *

UNITED STATES PATENT AND TRADEMARK OFFICE
CERTIFICATE OF CORRECTION

PATENT NO. : 8,641,136 B2  
APPLICATION NO. : 12/672886  
DATED : February 4, 2014  
INVENTOR(S) : Kring et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 483 days.

Signed and Sealed this
Second Day of June, 2015

Michelle K. Lee
*Director of the United States Patent and Trademark Office*